(12) United States Patent
Hjerpe

(10) Patent No.: US 9,657,589 B2
(45) Date of Patent: May 23, 2017

(54) SYSTEM FOR WASHING AN AERO GAS TURBINE ENGINE

(71) Applicant: EcoServices, LLC, Wethersfield, CT (US)

(72) Inventor: Carl-Johan Hjerpe, Nacka (SE)

(73) Assignee: EcoServices, LLC, Wethersfield, CT (US)

(*) Notice: Subject to any disclaimer, the term of this patent is extended or adjusted under 35 U.S.C. 154(b) by 108 days.

(21) Appl. No.: 14/562,114

(22) Filed: Dec. 5, 2014

(65) Prior Publication Data
US 2015/0083169 A1 Mar. 26, 2015

Related U.S. Application Data

(60) Continuation of application No. 13/887,575, filed on May 6, 2013, which is a division of application No.
(Continued)

(51) Int. Cl.
*B05B 12/00* (2006.01)
*B08B 3/02* (2006.01)
(Continued)

(52) U.S. Cl.
CPC .......... *F01D 25/002* (2013.01); *B05B 7/0093* (2013.01); *B05B 7/166* (2013.01);
(Continued)

(58) Field of Classification Search
CPC .. B08B 3/02; B08B 9/00; B08B 3/026; F01D 25/002; B05B 12/002; B60S 3/044
(Continued)

(56) References Cited

U.S. PATENT DOCUMENTS 1,834,534 A 12/1931 Richards et al.
1,890,156 A 12/1932 Konig
(Continued)

FOREIGN PATENT DOCUMENTS

CH 341262 A 9/1959
DE 2701823 A1 8/1977
(Continued)

OTHER PUBLICATIONS

International Search Report and Written Opinion from PCT Application Serial No. PCT/EP2005/052643, Dated Aug. 31, 2005, 7 pages
(Continued)

*Primary Examiner* — Michael Barr
*Assistant Examiner* — Levon J Shahinian
(74) *Attorney, Agent, or Firm* — Westman, Champlin & Koehler, P.A.

(57) ABSTRACT

A wash system includes a wash unit associated with a mobile unit for providing wash fluid, one or more nozzles for streamline injecting wash fluid provided by the wash unit directly into an engine inlet, and an articulating arm for use in positioning the one or more nozzles. The wash unit is physically spaced from a surface of the engine inlet cowling during a washing process. The articulating arm is operable via one of a hydraulic, pneumatic, electrical, or mechanically hand-driven operating means.

19 Claims, 12 Drawing Sheets

Related U.S. Application Data

11/629,509, filed as application No. PCT/EP2005/052643 on Jun. 8, 2005, now Pat. No. 8,479,754.

(51) Int. Cl.
| | |
|---|---|
| *B08B 9/00* | (2006.01) |
| *B60S 3/04* | (2006.01) |
| *F01D 25/00* | (2006.01) |
| *B05B 7/00* | (2006.01) |
| *B05B 7/16* | (2006.01) |
| *B05B 7/26* | (2006.01) |
| *B08B 3/00* | (2006.01) |
| *B08B 3/08* | (2006.01) |
| *B08B 3/10* | (2006.01) |
| *B08B 9/093* | (2006.01) |
| *E03B 1/04* | (2006.01) |

(52) U.S. Cl.
CPC .............. *B05B 7/26* (2013.01); *B05B 12/002* (2013.01); *B08B 3/003* (2013.01); *B08B 3/02* (2013.01); *B08B 3/026* (2013.01); *B08B 3/08* (2013.01); *B08B 3/10* (2013.01); *B08B 9/00* (2013.01); *B08B 9/093* (2013.01); *B60S 3/044* (2013.01); *E03B 1/042* (2013.01); *F05D 2220/323* (2013.01)

(58) Field of Classification Search
USPC .............. 134/113, 123, 166 R, 167 R, 168 R, 134/168 C, 167 C, 169 R, 169 A, 169 C, 134/170, 171, 166 C, 172, 198
See application file for complete search history.

(56) References Cited

U.S. PATENT DOCUMENTS

| | | |
|---|---|---|
| 1,926,924 A | 9/1933 | Sylvan |
| 2,041,826 A | 5/1936 | Garnier |
| 2,385,393 A | 9/1945 | Wilson |
| 2,735,464 A | 2/1956 | Kerven |
| 2,760,597 A | 8/1956 | Brixius |
| 2,878,892 A | 3/1959 | Field |
| 3,074,822 A | 1/1963 | Walk et al. |
| 3,081,953 A | 3/1963 | Bammann |
| 3,168,247 A | 2/1965 | Schild |
| 3,439,372 A | 4/1969 | Collier |
| 3,527,030 A | 9/1970 | Hungate |
| 3,564,820 A | 2/1971 | Nelson |
| 3,616,623 A | 11/1971 | Reid |
| 3,623,668 A | 11/1971 | Freid et al. |
| 3,630,777 A | 12/1971 | Kazutomo et al. |
| 3,766,719 A | 10/1973 | McAnally, III |
| 3,897,263 A | 7/1975 | Davis et al. |
| 3,938,972 A | 2/1976 | Sugimura |
| 3,940,608 A | 2/1976 | Kissinger et al. |
| 4,059,123 A | 11/1977 | Bartos et al. |
| 4,065,322 A | 12/1977 | Langford |
| 4,158,449 A | 6/1979 | Sun et al. |
| 4,196,020 A | 4/1980 | Hornak et al. |
| 4,225,188 A | 9/1980 | McGuire et al. |
| 4,229,303 A | 10/1980 | Heinrich et al. |
| 4,234,323 A | 11/1980 | Maher |
| 4,241,744 A | 12/1980 | Jordan, Sr. |
| 4,300,918 A | 11/1981 | Cary |
| 4,462,192 A | 7/1984 | Fisher |
| 4,511,488 A | 4/1985 | Matta |
| 4,530,707 A | 7/1985 | Ovard |
| 4,543,108 A | 9/1985 | Wurz |
| 4,557,740 A | 12/1985 | Smith |
| 4,595,419 A | 6/1986 | Patenaude |
| 4,646,875 A | 3/1987 | Sholl |
| 4,713,120 A | 12/1987 | Hodgens, II et al. |
| H535 H | 10/1988 | Sam et al. |
| 4,802,901 A | 2/1989 | Wurz et al. |
| 4,834,912 A | 5/1989 | Hodgens, II et al. |
| 4,877,043 A | 10/1989 | Carmichael et al. |
| 4,975,101 A | 12/1990 | Swanborn |
| 4,983,224 A | 1/1991 | Mombrun et al. |
| 5,011,540 A | 4/1991 | McDermott |
| 5,018,355 A | 5/1991 | Foster |
| 5,018,544 A | 5/1991 | Boisture et al. |
| 5,045,217 A | 9/1991 | Ronan et al. |
| 5,112,516 A | 5/1992 | Koetzle |
| 5,137,555 A | 8/1992 | Fewel, Jr. |
| 5,188,293 A | 2/1993 | Burton |
| 5,268,011 A | 12/1993 | Wurz |
| 5,269,823 A | 12/1993 | Wurz |
| 5,273,059 A | 12/1993 | Gross et al. |
| 5,273,395 A | 12/1993 | McDermott |
| 5,281,354 A | 1/1994 | Faber |
| 5,306,351 A | 4/1994 | Anderson |
| 5,310,022 A | 5/1994 | Sheridan et al. |
| 5,318,254 A | 6/1994 | Shaw et al. |
| 5,376,298 A | 12/1994 | Michael |
| 5,401,325 A | 3/1995 | Mihelic et al. |
| 5,454,533 A | 10/1995 | Grant et al. |
| 5,458,299 A | 10/1995 | Collins et al. |
| 5,464,459 A | 11/1995 | VanBuskirk et al. |
| 5,489,234 A | 2/1996 | Hockett |
| 5,518,553 A | 5/1996 | Moulder |
| 5,597,001 A | 1/1997 | Rasmussen et al. |
| 5,725,611 A | 3/1998 | Wright et al. |
| 5,762,719 A | 6/1998 | DMuhala et al. |
| 5,833,762 A | 11/1998 | Wanner et al. |
| 5,868,860 A | 2/1999 | Asplund |
| 5,899,217 A | 5/1999 | Testman, Jr. |
| 5,972,062 A | 10/1999 | Zimmermann |
| 6,017,377 A | 1/2000 | Brown et al. |
| 6,073,637 A | 6/2000 | Hayward et al. |
| 6,080,225 A | 6/2000 | Forster |
| 6,134,734 A | 10/2000 | Marrero |
| 6,206,013 B1 | 3/2001 | Hormann |
| 6,250,588 B1 | 6/2001 | Numbers et al. |
| 6,263,889 B1 | 7/2001 | Flynn et al. |
| 6,289,905 B1 | 9/2001 | Yarnold |
| 6,310,022 B1 | 10/2001 | Amiran |
| 6,367,489 B1 | 4/2002 | Yamamoto |
| 6,394,108 B1 | 5/2002 | Butler |
| 6,470,668 B2 | 10/2002 | Payling et al. |
| 6,478,033 B1 | 11/2002 | Foster |
| 6,481,448 B2 | 11/2002 | Mathieu |
| 6,484,508 B2 | 11/2002 | Rocklin et al. |
| 6,491,048 B1 | 12/2002 | Foster |
| 6,503,334 B2 | 1/2003 | Ruiz et al. |
| 6,553,768 B1 | 4/2003 | Trewin et al. |
| 6,655,396 B2 | 12/2003 | Krenzel |
| 6,820,430 B1 | 11/2004 | Tassone et al. |
| 6,820,841 B2 | 11/2004 | Mittereder et al. |
| 6,883,527 B2 | 4/2005 | Travaly et al. |
| 6,938,405 B2 | 9/2005 | Carberg et al. |
| 6,964,699 B1 | 11/2005 | Carns et al. |
| 7,018,965 B2 | 3/2006 | Yan et al. |
| 7,065,955 B2 | 6/2006 | Reback et al. |
| 7,150,431 B2 | 12/2006 | Dennis |
| 7,185,663 B2 | 3/2007 | Koch et al. |
| 7,198,052 B2 | 4/2007 | Watt |
| 7,297,260 B2 | 11/2007 | Hjerpe et al. |
| 7,520,137 B2 | 4/2009 | Hoffmann et al. |
| 7,521,083 B2 | 4/2009 | Teichert |
| 7,934,467 B2 | 5/2011 | Morton |
| 2002/0179123 A1* | 12/2002 | Toward ..................... B08B 3/02 134/34 |
| 2003/0031964 A1 | 2/2003 | Hayward |
| 2003/0209256 A1 | 11/2003 | Tadayon |
| 2004/0016445 A1 | 1/2004 | Koch et al. |
| 2004/0028816 A1 | 2/2004 | Ackerman et al. |
| 2005/0199271 A1 | 9/2005 | Watt |
| 2005/0258275 A1 | 11/2005 | Williams |
| 2006/0060218 A1 | 3/2006 | Lakdawala et al. |
| 2006/0060233 A1 | 3/2006 | Lakdawala et al. |
| 2006/0219269 A1 | 10/2006 | Rice et al. |
| 2006/0243308 A1 | 11/2006 | Asplund et al. |
| 2007/0000528 A1 | 1/2007 | Asplund et al. |

(56) References Cited

U.S. PATENT DOCUMENTS

| | | |
|---|---|---|
| 2007/0048127 A1 | 3/2007 | O'Neill et al. |
| 2007/0059159 A1 | 3/2007 | Hjerpe |
| 2008/0149141 A1 | 6/2008 | Sales |
| 2008/0178909 A1 | 7/2008 | Alvestig et al. |
| 2008/0216873 A1 | 9/2008 | Hjerpe et al. |

FOREIGN PATENT DOCUMENTS

| | | | |
|---|---|---|---|
| DE | 3538539 | A1 | 5/1987 |
| DE | 9420362 | U1 | 3/1995 |
| EP | 0262097 | A2 | 3/1988 |
| EP | 0418736 | A2 | 3/1991 |
| EP | 0628477 | A1 | 12/1994 |
| EP | 1205640 | A2 | 5/2002 |
| EP | 1225307 | A2 | 7/2002 |
| FR | 2837123 | A1 | 9/2003 |
| GB | 2040092 | A | 8/1980 |
| GB | 2074048 | A | 10/1981 |
| JP | 52109769 | A | 9/1977 |
| JP | 54111097 | A | 8/1979 |
| JP | 6028848 | A | 2/1985 |
| JP | 658172 | A | 3/1994 |
| JP | 2002242613 | A | 8/2002 |
| JP | 2002256889 | A | 9/2002 |
| JP | 2004050960 | A | 2/2004 |
| KR | 20020034936 | A | 5/2002 |
| RU | 1776846 | A1 | 11/1992 |
| SU | 1755965 | A1 | 8/1992 |
| WO | WO9214557 | A1 | 9/1992 |
| WO | WO9638522 | A1 | 12/1996 |
| WO | WO9640453 | A1 | 12/1996 |
| WO | WO0109274 | A1 | 2/2001 |
| WO | WO2005121509 | A1 | 12/2005 |

OTHER PUBLICATIONS

Canadian Office Action from Canadian Application Serial No. 2570243, Dated Dec. 3, 2010, 3 pages.
Japanese Office Action from Japanese Application Serial No. 205931/2010, Dated Aug. 2, 2011, 6 pages.
Australian Office Action from Australian Application Serial No. 2011202165, Dated Feb. 27, 2012, 3 pages.
Communication Pursuant to Article 94(3) EPC, from EP Application Serial No. 10169653.2, Dated Oct. 26, 2015, 6 pages.

\* cited by examiner

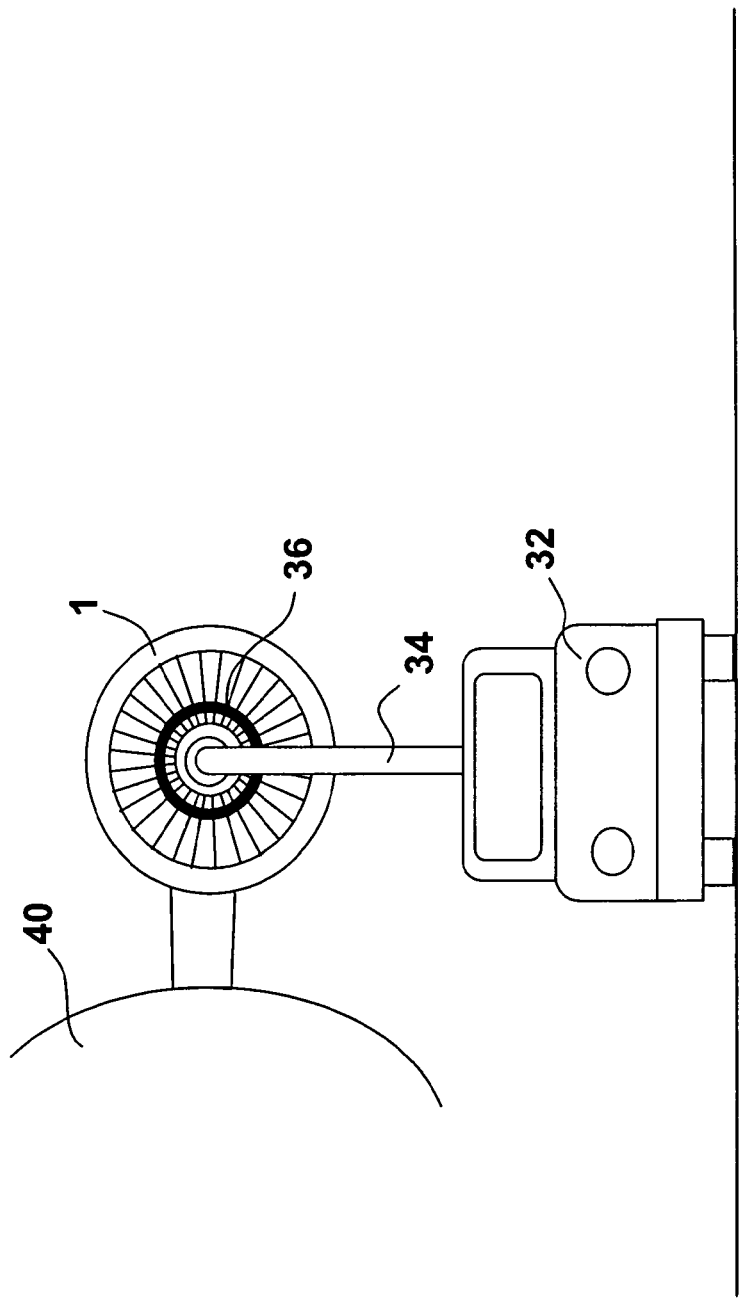

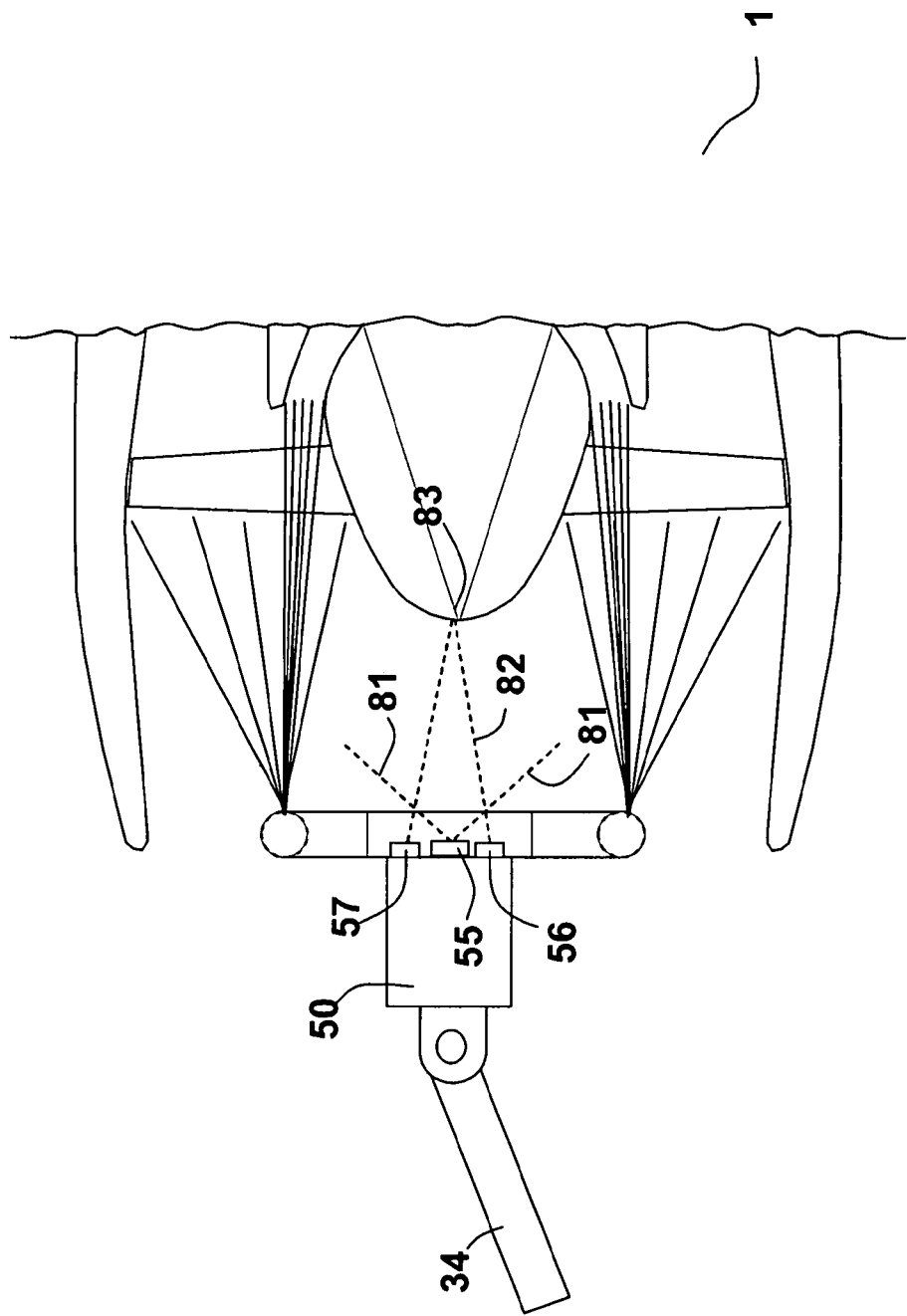

SYSTEM FOR WASHING AN AERO GAS TURBINE ENGINE

CROSS-REFERENCE TO RELATED APPLICATION(S)

The present application is a continuation application from U.S. patent application Ser. No. 13/887,575, filed May 6, 2013, which is a divisional application from U.S. patent application Ser. No. 11/629,509 (now U.S. Pat. No. 8,479,754), filed Mar. 14, 2007, which is a §371 U.S. National Stage Application of PCT/EP2005/052643, filed Jun. 8, 2005, and all of those prior applications are hereby incorporated by reference in their entireties.

TECHNICAL FIELD

The present invention generally relates to the field of washing gas turbine engines, and more specifically systems and a vehicle for washing a gas turbine engine installed on an aircraft.

BACKGROUND

A gas turbine aircraft engine comprises of a compressor compressing ambient air, a combustor burning fuel together with the compressed air and a turbine for powering the compressor. The expanding combustion gases drive the turbine and also result in thrust for propulsion.

Aircraft flying at high altitude ingest the clean air prevailing at these altitudes. However, at the aerodromes the air contains foreign particles in form of aerosols which enters the engine with the air stream. Typical particles found in the aerodrome air are pollen, insects, hydrocarbons coming from industrial activities and salt coming from nearby sea. While the aircraft is grounded at the airport there are additional particles to consider such as combustion residues in engine exhaust from taxing aircraft, chemicals coming from aircraft de-icing and ground material such as dust. The majority of the foreign particles will follow the gas path through the engine and exit with the exhaust gases. However, there are particles with properties of sticking on to components in the engine's gas path, especially in the compressor section of the engine. This is known as fouling.

Compressor fouling results in a change in the properties of the boundary layer air stream of the compressor components. The presence of foreign particles results in an increase of the component surface roughness. As air flows over the surface the increase of surface roughness results in a thickening of the boundary layer air stream. The thickening of the boundary layer air stream has negative effects on the compressor aerodynamics in form of a reduced mass flow. At the blade trailing edge the air stream forms a wake. The wake forms a vortex type of turbulence with a negative impact on the air flow. The thicker the boundary layer the stronger the turbulence in the wake and the more it reduces the mass flow. Further, a thick boundary layer and a stronger trailing edge turbulence result in a reduced compression gain which in turn results in the fouled compressor compressing air at a reduced pressure ratio. Anyone skilled in the art of heat engine working cycles understands that a reduced pressure ratio result in a lower thermal efficiency of the engine. The compressor fouling not only reduces the mass flow and pressure gain but also reduces the compressor isentropic efficiency. Reduced compressor efficiency means that the compressor requires more power for compressing the same amount of air. The power for driving the compressor is taken from the turbine via the shaft. With the turbine requiring more power to drive the compressor there will be less power to create thrust for propulsion. For the aircraft pilot this means he must throttle for more fuel as to compensate for the reduced thrust. Throttling for more fuel means the consumption of fuel increases and thereby increasing the operating costs. The performance loss caused by compressor fouling also reduces the durability of the engine. As more fuel has to be fired for reaching a required thrust level, follows an increase in the engine firing temperature. When the pilot on the runway throttles for take-off, the engine's hot section components are under critical high temperature load. Controlling the combustion gas temperature is a key issue in engine performance monitoring. The controlling temperature known as exhaust gas temperature (EGT) is measured with sensors in the gas path downstream of the combustor outlet. The EGT is carefully monitored by logging both temperature and exposure time. During the lifetime of the engine the EGT log is frequently reviewed. At a certain point it will be required that the engine is taken out of service for an overhaul where hot section components are inspected and replaced if required.

Compressor fouling also has a negative effect on the environment. The difference in fuel consumption of a virgin engine delivered from the factory and an engine with a fouled compressor may typically be 1%. With the increase of fuel consumption follows an increase of emissions of green house gas such as carbon dioxide. Typically combustion of 1 kg of aviation fuel results in formation of 3.1 kg carbon dioxide. Further, high combustor temperature has a negative effect to the environment. With the increase of firing temperature follows an increase of NOx formation. NOx formation depends to a large extent on the design of the burner and a general number can not be provided. However, any incremental temperature rise to a given burner design results in an increase in NOx formation. Hence, compressor fouling has negative effects to aero engine performance such as increasing fuel consumption, reducing engine life and increasing emissions.

A number of engine washing techniques has developed over the years as to reduce or eliminate the negative effects of fouling. The simplest washing method is taking a garden hose and spraying water into the engine inlet. This method has however limited success due to the simple nature of the process. An alternative method is hand scrubbing the blades with a brush and liquid. This method has limited success as it does not enable cleaning of the blades in the interior of the compressor. Moreover, it is time-consuming. U.S. Pat. No. 5,868,860 to Asplund discloses the use of a manifold for washing of aero engines. Further the patent discloses the use of high liquid pressure as means of providing a high liquid velocity, which together with rotation of the engine shaft will enhance the cleaning efficacy. U.S. Pat. No. 6,394,108 to Butler discloses a thin flexible hose which one end is inserted from the compressor inlet towards the compressor outlet in between the compressor blades. At the inserted end of the hose there is a nozzle. The hose is slowly retracted out of the compressor while liquid is being pumped into the hose and sprayed through the nozzle. However, the washing efficacy is limited by the compressor rotor not being able to rotate during washing. Despite existing wash technologies and patents there is a need for new technologies enabling practical washing to be conducted in a less labour intensive, low cost, simple and safe way.

SUMMARY

The commercial air traffic has developed into an efficient tool for carrying passengers and goods from one place to another. The aircraft fleet today comprises of a large number of aircraft types supplied by many aircraft manufacturers. The engines used for propelling these aircrafts are manufactured by several engine manufacturers, supplying engines of different size and with different performance characteristics. Engine manufacturers also supply engines that are compatible with engines from other manufacturers which mean that there are alternative engines, although not identical, available for the same aircraft. This result in a large possible combination of aircraft engines on aircraft types. This is found being a disadvantage when practising washing as the wash equipment need to be sized and engineered to meet the individual designs. It is the purpose of this invention to simplify washing of the engines.

The practising of engine washing described with reference to FIG. 1 is further regarded as common knowledge in this field. A cross section view of a two shaft turbofan engine is shown in FIG. 1. Arrows show the gas flow through the engine. Engine 1 is built around a rotor shaft 14 which at its front end is connected to fan 15 and at the rear end to turbine 16. Turbine 16 drives fan 15. A second shaft 19 is in form of a coaxial to first shaft 14. Shaft 19 is connected at its front end to compressor 17 and rear end to turbine 18. Turbine 18 drives compressor 17. Engine 1 has an inlet 110 where inlet air enters the engine. Cowling 11 serves as a guide for the inlet air stream. The inlet air flow is driven by fan 15. One portion of the inlet air exits at outlet 11. The remaining portion of the inlet air enters into the core engine at inlet 13. The air to the core engine is then compressed by compressor 17. The compressed air together with fuel (not shown) is combusted in combustor 101 resulting in pressurized hot combustion gases. The pressurized hot combustion gases expand towards core engine outlet 12. The expansion of the hot combustion gases is done in two stages. In a first stage the combustion gases expands to an intermediate pressure while driving turbine 18. In a second stage the hot combustion gases expands towards ambient pressure while driving turbine 16. The combustion gases exits the engine at outlet 12 at high velocity providing thrust. The gas from outlet 12 together with air from outlet 11 together make up the engine thrust.

A washing device according to prior art consist of a manifold 102 in form of a tube which in one end is connected to a nozzle 103 and the other end connected to a coupling 104. Hose 105 is at one end connected to coupling 104 while the other end is connected to a liquid pump (not shown). Manifold 102 is resting upon inlet cowling 11 and held in firm position during washing by securing it with a strap or similar means. The wash procedure begins by cranking the engine shaft with help of the engine's starter motor. The pump pumps a wash liquid to nozzle 103 where it atomizes and forms a spray 104. The rotation of the shaft results in an air flow through the engine. This air flow will drive liquid through the engine and release fouling material. The fouling material is released by mechanical and chemical act of the washing liquid. The cleaning effect is enhanced by the shaft rotation as the wetting of blades creates a liquid film which will be subject to forces such as the air draught and centrifugal forces during washing.

Prior art describes the use of a manifold with nozzles for injecting the wash fluid into the engine inlet. It is common that the manifold is placed in the inlet cowling while using the cowling for its support. The manifold is thus temporarily installed for the washing process and is removed after completion of the wash. FIG. 2 shows an example of a prior art manifold when installed in a turbofan engine inlet. Similar parts are shown with the same reference numbers as FIG. 1. Manifold 102 is resting on inlet cowling 11 of the air intake to engine 1. Manifold 102 is fabricated to fit the shape of the inlet cowling as to be in firm position during washing. To ensure that the manifold is held in a firm position, a strap 21 is attached to the manifold outside of the inlet and tighten against a hook (not shown) hooked on to the engine outlet. Wash liquid is pumped by a pump (not shown) through hose 105 via coupling 104 to manifold 102 and further to nozzles 103. Manifold 102 is in form of a tube which serves as a conduit for the wash liquid. Manifold 102 also act as a stiff support to the nozzles as to hold the nozzles in firm position during washing. For a good wash result a proper positioning of the manifold is mandatory. For this purpose the manifold has to be designed and engineered with respect to the shape of the inlet cowling and the characteristic geometry of the engine. Further, the manifold has to be designed and engineered as to appropriately support the nozzles against spray reaction forces during washing.

As mentioned above there are many different aircraft types and many different aircraft engines which result in many different inlet air cowling designs. As the manifold takes support on the inlet cowling this means that many different manifolds will have to be manufactured as to service a large fleet of aircraft. This is a disadvantage as an airline operator will have to stock a large number of manifolds.

This invention as described in the preferred embodiments discloses a manifold that has no contact with the inlet cowling. The manifold according to the invention then eliminate the requirement of matching the inlet cowling design and thereby the need for a large number of manifolds. It is the purpose of this invention to reduce the number of manifold the airline operator has to keep in stock.

The manifolds according to prior art are of large dimensions as a result of the large intake geometry of large aircraft engines. The manifolds thereby require significant storage space at storage.

The invention as described in the preferred embodiments discloses a universal manifold that is significantly smaller in size compared to prior art manifolds. It is the purpose of this invention to reduce the storage space by providing a small manifold.

The manifolds according to prior art design result in significant amount of labour hours to engineer, manufacture and test for fit. Further, the manifold is put in production in only small series as there may not be too many aircraft with a specific combination of engine and inlet cowling. This invention as described in the preferred embodiments discloses a universal manifold applicable to a large range of aircraft and aircraft engines. The manifold according to the invention is in principal engineered once and may be but in production in larger series. This will reduce the costs for the universal manifold. It is the purpose of this invention to reduce costs for the airline operator.

Washing aircraft engines may be conducted by the airline operator or by a specialist organisation like an Airport Engine Wash Service Centre. If the washing is conducted by a service centre the disadvantage by having many manifolds in stock is even more an issue of concern as the service centre will service a large number of different aircraft and aircraft engines. It is the purpose of this invention to reduce costs for the Airport Engine Wash Service Centre operator.

As disclosed in the preferred embodiment of this invention the universal, no-contact manifold according to the invention is put and held in position by the use of an arm such as a robotic arm. The robotic arm can be operated with a hydraulic, pneumatic, electric or mechanically hand driven operating device, and can be operated from a control panel by an operator adjacent to the engine. The robotic arm allows the universal manifold to be positioned in the intake of the engine without physical contact between the aircraft and the universal manifold. The use of a robotic arm for positioning the manifold simplifies the set-up operations and makes the set-up safer. The wash operations can be viewed by the operator by direct eye contact with the engine inlet or by help of a viewing device such as an instant recording camera on the robotic arm. The use of a camera enables the operator to position the manifold and as well view details of the wash operation which he may not otherwise see.

There have been mentioned some issues of concern related to the use of the prior art manifold. The use of a robotic arm is a safety device reducing the risk of accidental damage. The prior art manifold can create a risk of damage to the aircraft, e.g. a dent on the cowling, by accidental handling of the manifold during installation or removal. This invention as described in the preferred embodiments discloses the use of a robotic arm for a simplified and safer positioning of the manifold and thereby reducing the risk of accidental damage. It is the purpose of this invention to reduce the risk of accidental damage.

Any work done on the aircraft such as washing the engines requires that the operations comply with the instructions given by the Aircraft Maintenance Manual. This manual gives instructions on engine wash requirements and limitations such as installing an object like a wash manifold on the engine inlet cowling. By the use of a no-contact manifold according to the preferred embodiments of this invention it is not necessary to consult the Aircraft Maintenance Manual for purpose of installing the manifold. It is the purpose of this invention to avoid any conflict with any aircraft operational instructions such as the Aircraft Maintenance Manual by a manifold with no contact with the aircraft.

Conducting an engine wash requires that the aircraft has to be taken out of service for some time. It is in the interest of the airline operator to reduce the time the aircraft is out of service. The use of the universal and no-contact manifold according to the invention reduce the time for the wash operation as the set-up time for the manifold is shortened. Further, the universal and no-contact manifold can be operated by only one operator present at the aircraft or alternatively by remote control. It is the purpose of this invention to shorten the time for the wash operation and to reduce the labour requirement.

Further objects and advantages of the present invention will be discussed below by means of exemplifying embodiments.

BRIEF DESCRIPTION OF THE DRAWINGS

Preferred embodiments of the invention will now be described in greater detail with reference to the accompanying drawings, in which:

FIG. 4b shows the application of the invention when washing a 'tail' mounted engine.

FIG. 8 shows how the wash procedure is controlled by means of a camera and distance measuring device installed on the spray head.

DETAILED DESCRIPTION

The invention disclosed heir in describes a system including a manifold that has no contact with the inlet air cowling. Having no contact with the inlet air cowling eliminates the issue of manufacturing adapted manifolds to the large number of aircraft engine inlet cowlings. Further, the manifold disclosed heir in is universal in the meaning that it may service small engines as well as large engines as the manifold has multi size capabilities. A manifold having multi size capability eliminates the issue of manufacturing many manifolds for aircraft engines of varying size.

Figure 3:
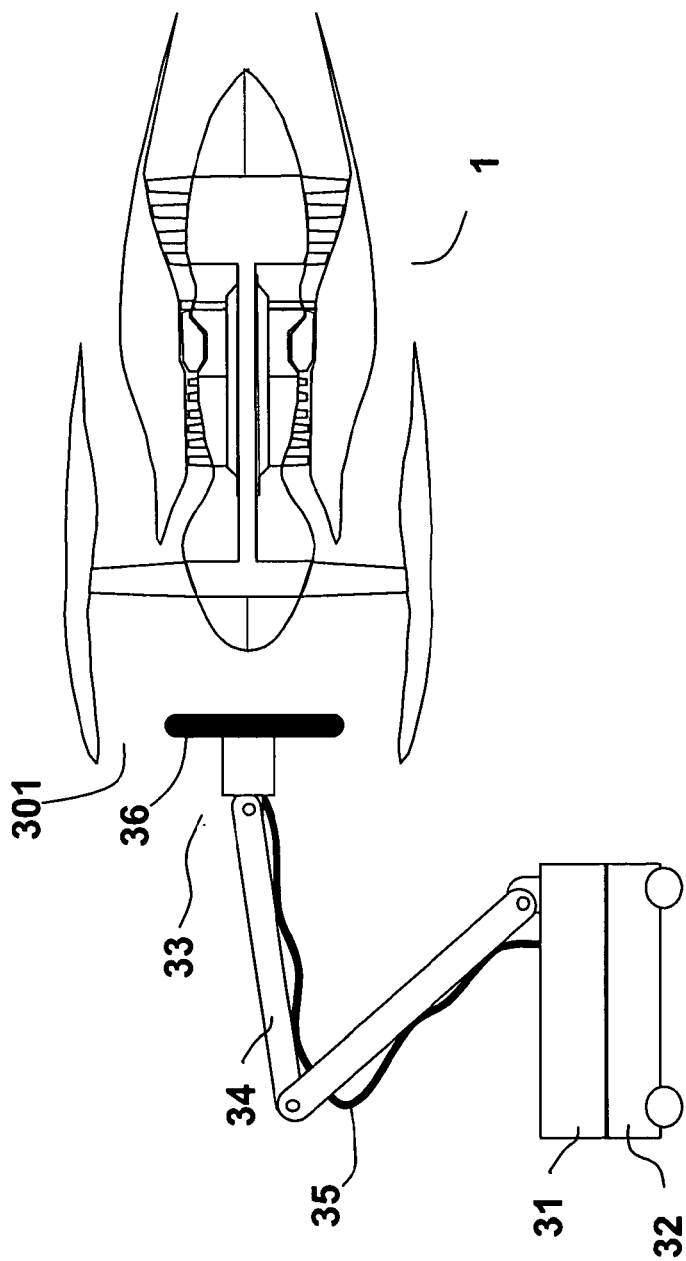
FIG. 3 shows the wash unit with the no-contact spray head according to the invention.

FIG. 3 shows the application of the universal and non-contact manifold according to the invention. An aero engine 1 installed on an aircraft (not shown) is subject to washing. Wash unit 31 is a unit for delivering wash liquid to a spray head 33. Spray head 33 includes a manifold 36 for distributing the liquid to nozzles (not shown for clarity) on manifold 36. The nozzles inject the wash liquid into the engine inlet. The nozzles may either atomize the liquid or inject liquid as a solid stream. Wash unit 31 comprises of the necessary equipment and components for enabling washing such as tanks for storing wash liquid, heaters for heating the liquid, a pump for raising the liquid pressure, controls required to enable and monitor the wash operation. The liquid may be water only or water with chemicals or chemicals only such as solvents. Typically the liquid is heated as washing with hot liquid as hot liquid enhances the wash result. The wash liquid is pressurized by the pump for distribution to the nozzles. The controls typically comprise of liquid pressure meter, liquid flow meter, liquid temperature meter and pump on-off switch. Wash unit 31 may be mobile as to make it practical for use for washing aircraft engines at an airport. Wash unit 31 may then be part of a vehicle 32. Vehicle 32 may be a hand towed cart or a motor driven cart or a person carrying vehicle such as a small truck. Alternatively, wash unit 31 may not be mobile.

Spray head 33 is held in fixed position in the inlet of engine 1 by robotic arm 34. Robotic arm 34 is at one end installed on wash unit 31 and has spray head 33 on the other end. Robotic arm 34 has at least one articulated joint and a wrist enabling appropriate positioning of spray head 33 in inlet 301 of engine 1. The robotic arm is moveable with at least three degrees of freedom. Robot arm 34 operates by a hydraulic or pneumatic or electric or mechanically hand driven operating device (not shown) or may be moved by hand force. In an embodiment of the present invention, the robotic arm may comprise one or several telescopic parts. For example, a part between two joints may be telescopic.

Spray head 33 is sized to be smaller than the opening of inlet 301. Spray head 33 is preferably positioned in inlet 301 by operating robotic arm 34 from a control panel (not shown) by an operator. Spray head 33 is positioned essentially in the centre of the opening of inlet 301. When spray head 33 is in its appropriate position there is no contact between the aircraft and the spray head or any other parts of the washing device. Wash unit 31 delivers the pressurized wash liquid to spray head 33 via conduit 35 where conduit 35 comprises of a flex hose or similar device for that service. In spray head 33 the liquid is distributed to a multiple of nozzles via manifold 36 where the nozzles have the purpose of injecting the wash liquid into the engine.

Figure 1:
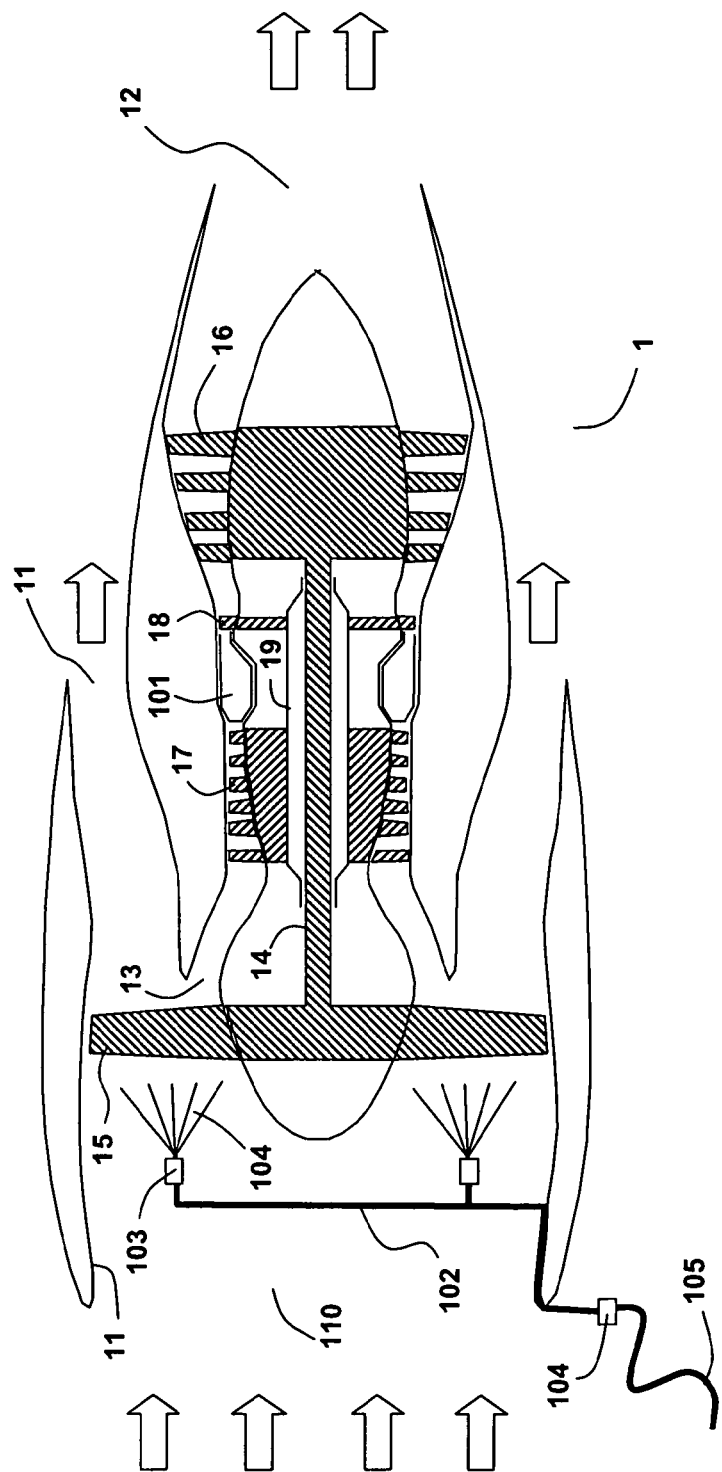
FIG. 1 shows the cross section of a two shaft turbofan engine with manifold and nozzles for washing according to prior art.
Figure 2:
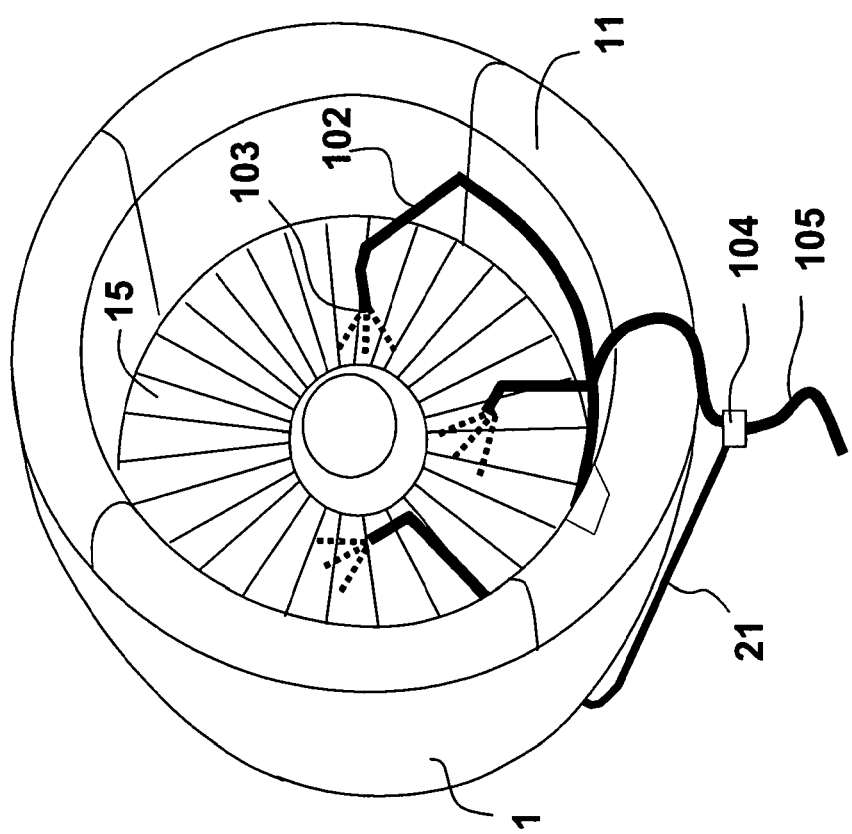
FIG. 2 shows the manifold installed in the inlet of an aero engine according to prior art.
Figure 4A:
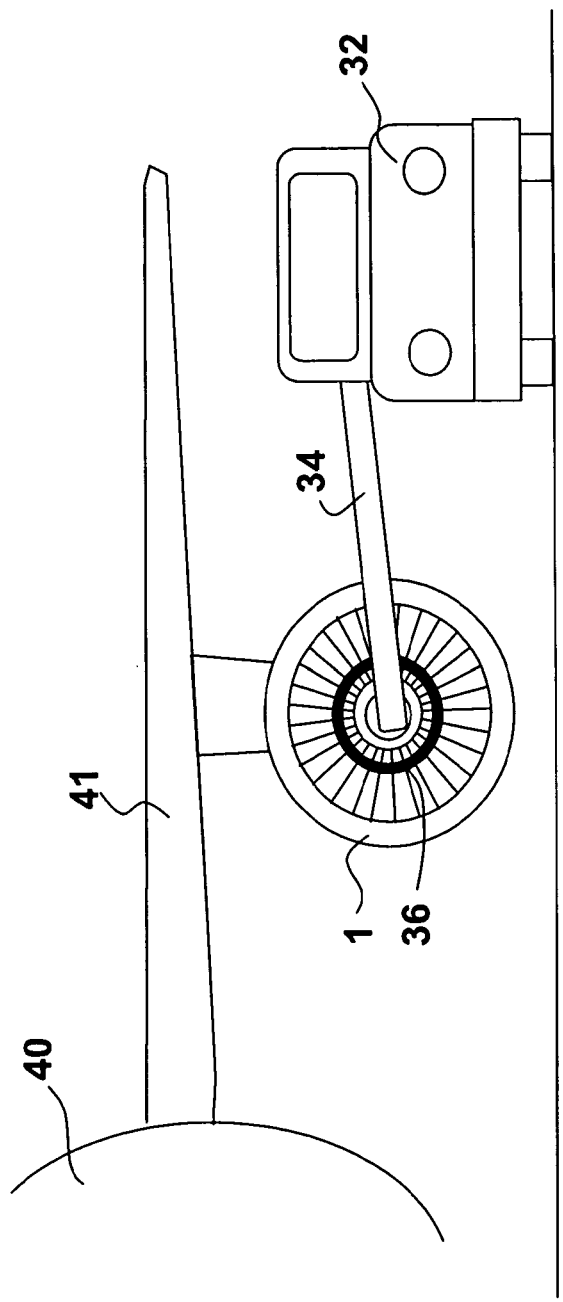
FIG. 4a show the application of the invention when washing an 'under wing' mounted engine.

FIG. 4a exemplifies the invention when in position for use when washing an engine of an 'under wing engine' type aircraft. Similar parts are shown with the same reference numbers as FIG. 1 and FIG. 3. Aircraft 40 has a wing 41 on which engine 1 is installed. Vehicle 32 with the wash unit is parked adjacent to the engine. Vehicle 32 is preferably parked at one side of the engine as not to be standing in the direct air stream during washing. This is to avoid that any loose objects on the vehicle may accidentally be brought by the air stream into the engine. Robotic arm 34 holds the spray head with its manifold 36 in position in the engine inlet. There is no contact between the aircraft and the manifold or any other parts of the wash unit. FIG. 4b exemplifies the invention when in position for use when washing an engine of a 'tail engine' type aircraft. Similar parts are shown with the same reference numbers as FIG. 1 and FIG. 3. Vehicle 32 with the wash unit is parked adjacent to the engine. Robotic arm 34 holds the spray head and its manifold 36 in position in the engine inlet. There is no contact between the aircraft and the manifold or any other parts of the wash unit. The invention is not limited to the illustrations in FIG. 4a and FIG. 4b as there are many other aircraft of different designs where the invention is equally applicable. Further, there may be aircraft where there is an advantage to arrange for the wash equipment to take support by the cowling or other parts of the aircraft.

Figure 5:
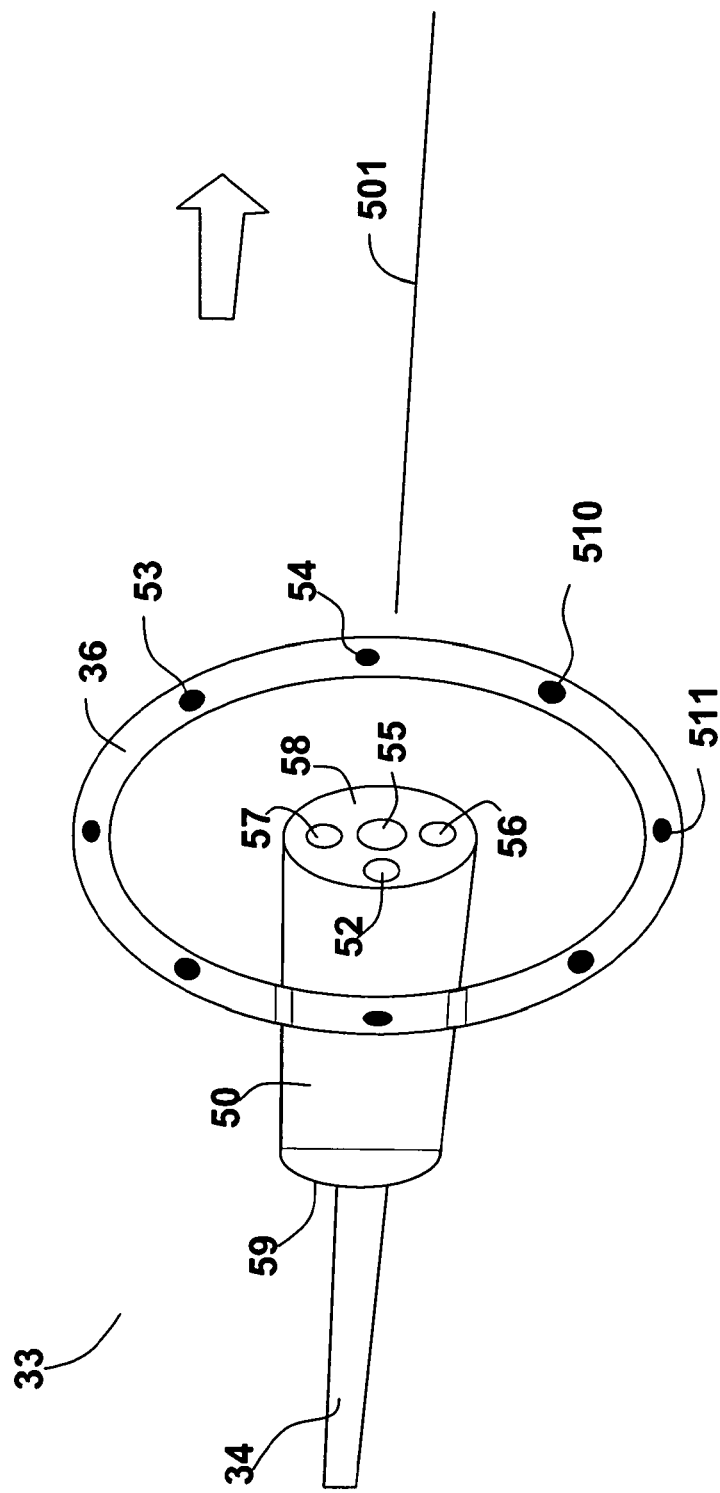
FIG. 5 shows spray head details according to the invention.

FIG. 5 shows the details of spray head 33. Spray head 33 is shown in a perspective view where the arrow shows the direction of the engine air flow. Similar parts are shown with the same reference numbers as FIG. 3. Spray head 33 comprises of a unit with essentially rotational symmetry with axis 501 being the centre of symmetry. When spray head 33 is in position for washing axis 501 is essentially aligned with the engine shaft centre of symmetry. Spray head 33 has a central body 50. Body 50 has a front end 58 faced towards the engine. Body 50 has a rear end 59 opposite to front end 58. Rear end 59 is connected to robotic arm 34. Body 50 includes optical sensing device 55 used as an aid for positioning spray head 33 and for monitoring the wash operation. Optical sensing device 55 is directed essentially towards the engine inlet. Optical sensing device 55 may comprise of a camera where the camera view can instantaneously be viewed by the operator at the control panel. Alternatively, the optical sensing device may comprise of a fibre optic device with the same purpose as the camera. Alternatively, there are other means of recoding the view form the spray head. Optical sensing device 55 serves the purpose to deliver a view of the engine inlet to the operator. The camera view is used for helping the operator to align the spray head with the engine shaft centre by manoeuvring the robotic arm from the operator's control panel. Further, the camera view enables the operator to position the spray head at the appropriate distance upstream of the engine. Further, the camera view enables the operator monitor the washing process by delivering a view from the engine centre line during washing. Further, the camera view helps the operator take decision in adjusting any wash parameter from the view that the camera delivers. Further, the camera view is a safety improving device as the operator may stop the wash process as of anything he observes in the camera.

Body 50 in FIG. 5 include a distance measuring device for measuring the distance to the engine. Typically the distance measuring device comprises of a transmitter 56 and a receiver 57. The distance measuring device could comprise of a sound sensing device such as an ultra sound sensing device where the transmitter emits a sound beam which reflect on the engine nose bullet and where the reflected beam is received by the receiver. The distance from the transmitter and receiver is then estimated by the time difference for the signal from the transmitter to the receiver. Alternatively, the distance measuring device could be an optical measuring device such as a laser where the transmitter emits a laser beam which reflects on the engine nose bullet and is received by the receiver. Alternatively, there are other distance measuring devices that could be used. The recorded distance is delivered to the operating panel where the operator will use the information when adjusting the appropriate position of the spray head upstream of the engine. During washing the measured distance helps the operator control the wash process by reporting any changes in distances. The distance measure helps the operator take decision in adjusting any wash parameter if he finds the distance not to be appropriate. The distance measuring device is a safety improving device as the operator may stop the wash process if he finds the distance is not safe. The distance measuring device may include alarms which emit an alarm signal in form of an acoustic sound or a light flash if the distance is out of range. For example, if the measured distance decreases below a predetermined value. In one embodiment, this limit value can be adjusted by the operator by means of the control panel.

Body 50 include a lamp 52 for illuminating the engine inlet. The illumination improves the view from the camera as well as the view from direct eye contact with the engine inlet. Body 50 may include other device for improving the safety or for improving the wash operation.

As the man skilled within the art easily realizes, can each of the following features: the optical sensing device 55, the distance measuring device 56, 57, or the lamp 52 be used independently of the others. That is, the spray head 33 may, for example, only include the optical sensing means 55 or only the distance measuring device 56, 57.

Spray head 33 in FIG. 5 shows the manifold as a ring shaped tube, i.e. a torus. Liquid is pumped from the wash unit (not shown) via a hose (not shown) to manifold 36. Manifold 36 is essentially circular with the circle centre aligned with axis 501. The plane of manifold 36 is essentially perpendicular to axis 501. Manifold 36 is connected to body 50. Manifold 36 has multiple nozzles arranged around the manifold for different wash services. For example, Nozzle 53 serves the purpose of washing the engine fan. Nozzle 54 serves the purpose of washing the core engine. Nozzle 510 serves the purpose of washing the nose bullet. Nozzle 511 serves the purpose of washing the cowling. In addition to nozzles 53, 54, 510 and 511 the manifold may comprise of other nozzles (not shown) for washing other engine details. Manifold 36 has at least one nozzle 54. The nozzles may atomize the liquid into a spray of droplets. Alternatively, the nozzles may deliver the liquid as a non-atomized jet. The objective of using ring shaped manifolds is that the manifolds may be manufactured from one tube which is bent into a ring requiring only one joint (one weld). This is an advantage to alternative designs requiring many more joints. Any reduction in joints is regarded as a safety feature as joints may brake and can cause damage if loosened parts enter the engine. Further, the ring shaped manifold is considered safe as any accidental contact between the manifold and any aircraft parts would not imply contact with any sharp edges. Alternatively may the manifold be equipped with a cushion such as rubber foam material (not shown) as to pick up any force in case of an accidental contact with the engine.

Figure 6:
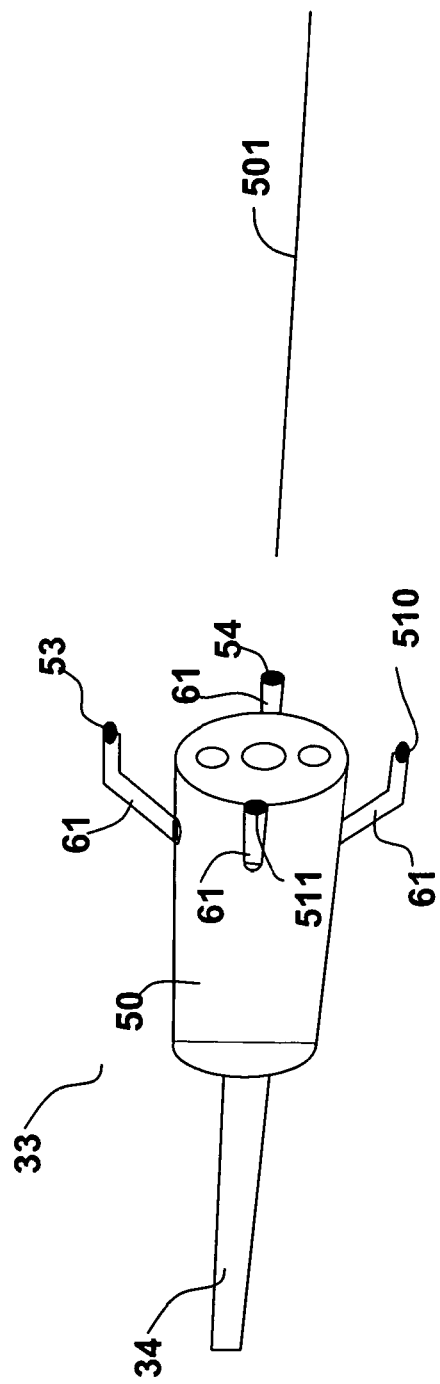
FIG. 6 shows an alternative embodiment of the spray head.

FIG. 6 shows an alternative embodiment of the spray head. Similar parts are shown with the same reference numbers as FIG. 3 and FIG. 5. The ring shaped manifold is here replaced by pipes 61 holding the nozzles in position. Alternatively, the manifold can be made differently.

Figure 7A:
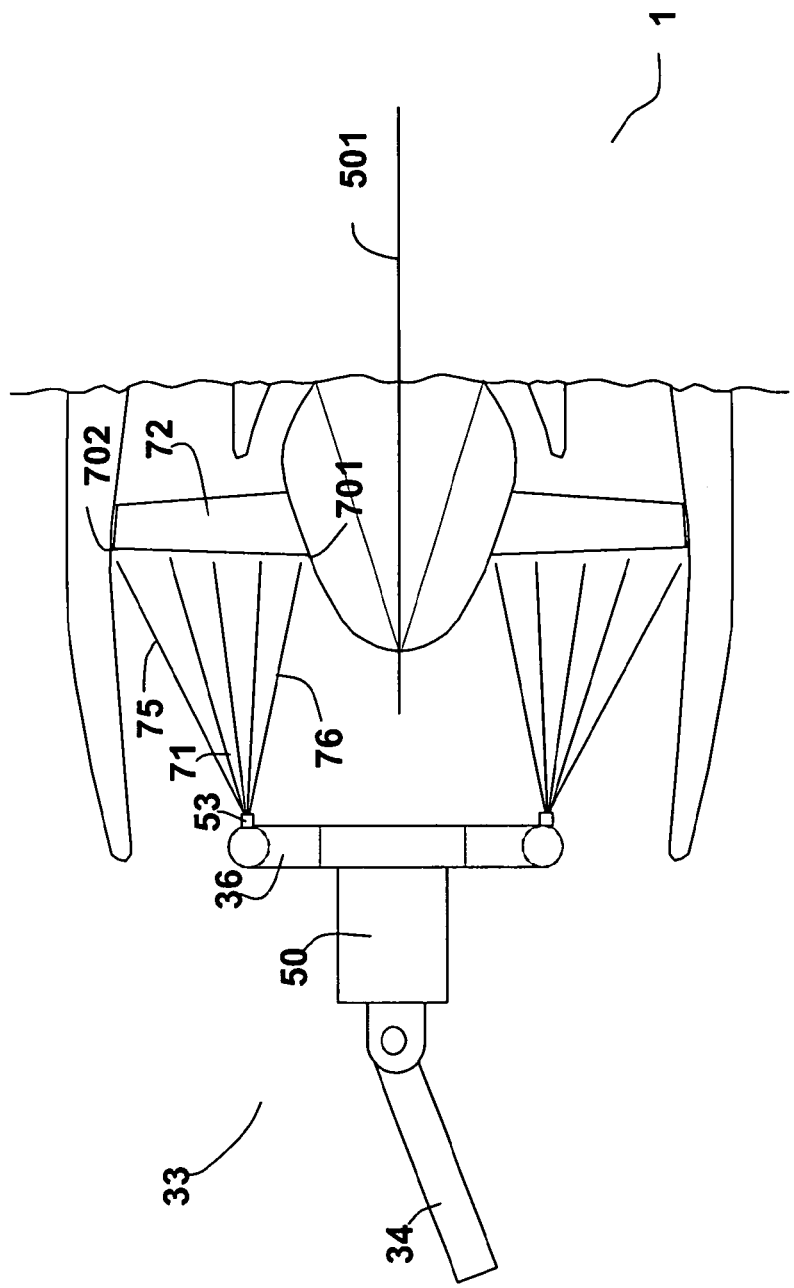
FIG. 7a shows washing of the fan of a turbofan engine according to the invention.
Figure 7B:
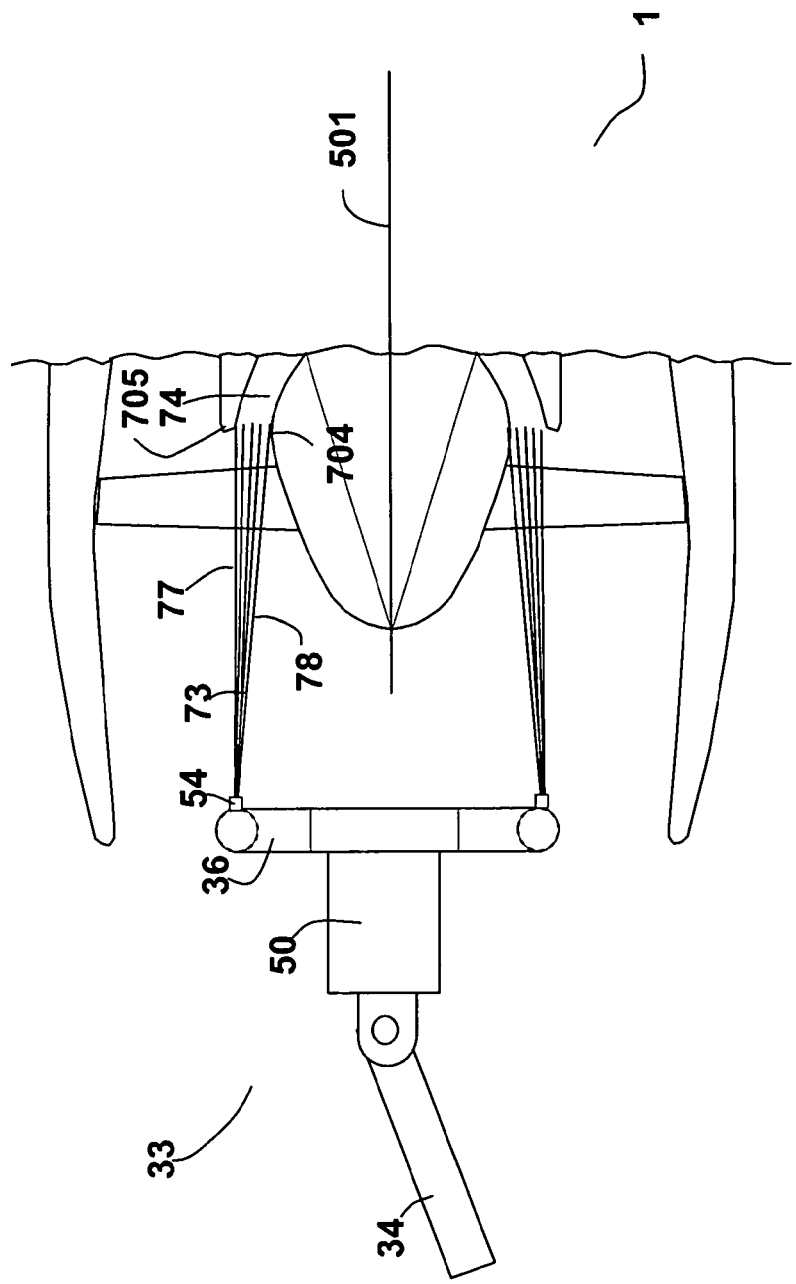
FIG. 7b shows washing of the core engine of a turbofan engine according to the invention.

FIGS. 7a, 7b and 8 shows the application of the invention when washing a turbofan engine. Similar parts are shown with the same reference numbers as previous figures. FIG. 7a shows the washing of the fan of turbofan engine 1 by use of nozzles for washing of the fan. During washing the fan is forced to rotation by the use of the engine starter motor. Nozzle 53 is atomizing the wash liquid into spray 71. The nozzles have a spray pattern resulting in a distribution of liquid limited on one side by streamline 75 and on the other side by streamline 76. The spray's distribution at the leading edge of fan blade 72 is essentially equal to the total blade length limited by tip point 702 and hub point 701. The spray thus covers the whole blade length. Manifold 51 may comprise of only one nozzle 53 which then only covers a portion of the engine inlet. Wetting of the whole fan is then accomplished by the rotation of the fan. FIG. 7b shows the washing of the core engine of turbofan engine 1. During washing the engine shaft is rotated by the use of the starter motor. Nozzle 54 is atomizing the wash liquid into spray 73. The nozzles have a spray pattern resulting in a distribution of liquid limited on one side by streamline 77 and the other side by streamline 78. The purpose of the spray is to deliver liquid into core engine inlet 74. The core engine inlet is limited by air splitter 705 and a point 704 on the hub on the opposite side of air splitter 705. The spray's distribution at the core engine inlet is equal to the core engine inlet opening limited by air splitter 705 and point 704. Thereby will the liquid emanating from nozzle 54 enter core engine inlet 74. Further, nozzle 54 is oriented as to enable the liquid to penetrate in between the blades during fan rotation. FIG. 7a and FIG. 7b describes washing of the turbofan engine by the use of the engine's starter motor. Alternatively may other starting device be used such as a separate APU starter. Alternatively, washing may be conducted without rotating the engine shaft.

FIG. 8 shows the use of the camera and the distance measuring device. Similar parts are shown with the same reference numbers as previous figures. A camera 55 has a viewing angle limited by lines 81. The camera will provide a view of the engine nose bullet enabling the operator to move the spray head to the appropriate position for washing. When the engine is cranked by its starter motor the camera view is used for monitoring the shaft rotation. The camera may then be attached to a computing device (not shown) with software for estimating the rotational speed. The rotational speed serves as an input parameter to the operator when to start liquid pumping. Having control of the rotational speed is essential for a good wash result. Further, the camera view allows viewing of the liquid distribution onto the fan as well as the penetration of liquid into the core engine.

This view serves as an important input to the operator as he may adjust the positioning of the spray head or adjust the wash parameters as to better serve his objectives. To avoid that the camera lens is contaminated with air borne liquid, the lens is purged by an air stream supplied from a compressed air source (not shown). The distance measuring device comprise of a transmitter 56 emitting a beam 82 towards nose bullet 83 where it reflect and returns the reflected beam to receiver 57. The signal is fed to a computing unit (not shown) for computing the distance. The computing unit may be set with alarm levels as to provide, e.g. an acoustic alarm, if the distance to any object becomes critically short. The distance measuring device may de directed towards other objects than the nose bullet in the engine inlet as to provide information on measured distances. To avoid that the measuring device sensors are contaminated with air born liquid they are purged by an air stream supplied from a compressed air source (not shown).

Figure 9:
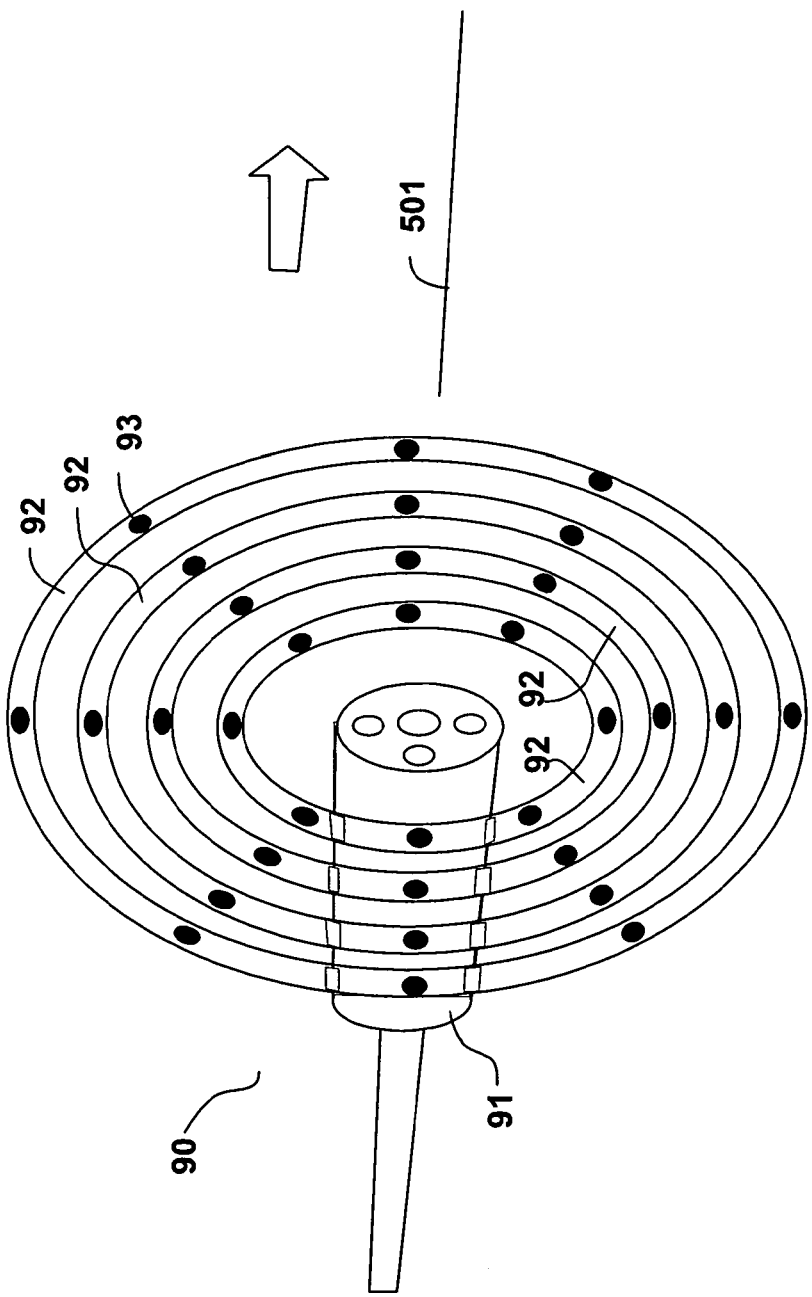
FIG. 9 shows the universal, no-contact spray head according to the invention.

FIG. 9 shows the universal spray head which will service a large range of differently sized engines. Spray head 90 is shown in a perspective view where the arrow shows the direction of the air flow. Spray head 90 has a central body 91 with similar camera, distance measuring device and lamp as earlier described in spray head 33 in FIG. 5. Spray head 90 comprise of multiple ring shaped manifolds 92 each with different diameters. Rings 92 are arranged in symmetry around central axis 501. Rings 92 are all essentially in the same plane where the planes are essentially perpendicular to axis 501. The rings are arranged with a gap in between the rings as to allow air flow through the spray head. Each ring comprises of one or multiple nozzles 93 where the nozzle type, number of nozzles and the nozzles spacing is according to the wash service the ring will do. Nozzles may be used for washing of the fan, the core engine, the cowling, the bullet nose or similar service. In principal, the inner rings are used for washing of smaller engines while the outer rings are used for washing of larger engines. Further, one ring may de dedicated to washing of a specific engine type or a specific family of engines. The ring with the largest diameter, i.e. the outer ring, has a diameter less than the diameter of the inlet cowling of the smallest engines that the spray head will service. For example, the engines of the popular passenger carrying commercial airlines have an inlet cowling diameter varying in between 1.5 to 3 meters. The spray head to service those engines would then have an outer diameter less than 1.5 meter.

For washing of an engine typically only one ring is in service. This is accomplished by having each ring 92 connected via a conduit to a distributor (not shown for clarity) on the spray head. The distributor comprise of individual valves for closing each conduit. Prior to set-up for washing the operator would activate the ring to be in use by opening the corresponding valve. All other valves would then be closed.

Although spray head 90 is universal in the meaning that it may service a wide range of aircraft types and engine types it is practical to have multiple spray heads that are exchangeable. This may be reasoned by different requirements set by the aircraft's instructions or other instructions. Another reason could be a separate spray head for meeting military aircraft requirements. There may be additional reasons. To accomplish changing of the spray heads the spray head is mounted on the robotic arm with a coupling enabling an easy exchange.

Figure 10:
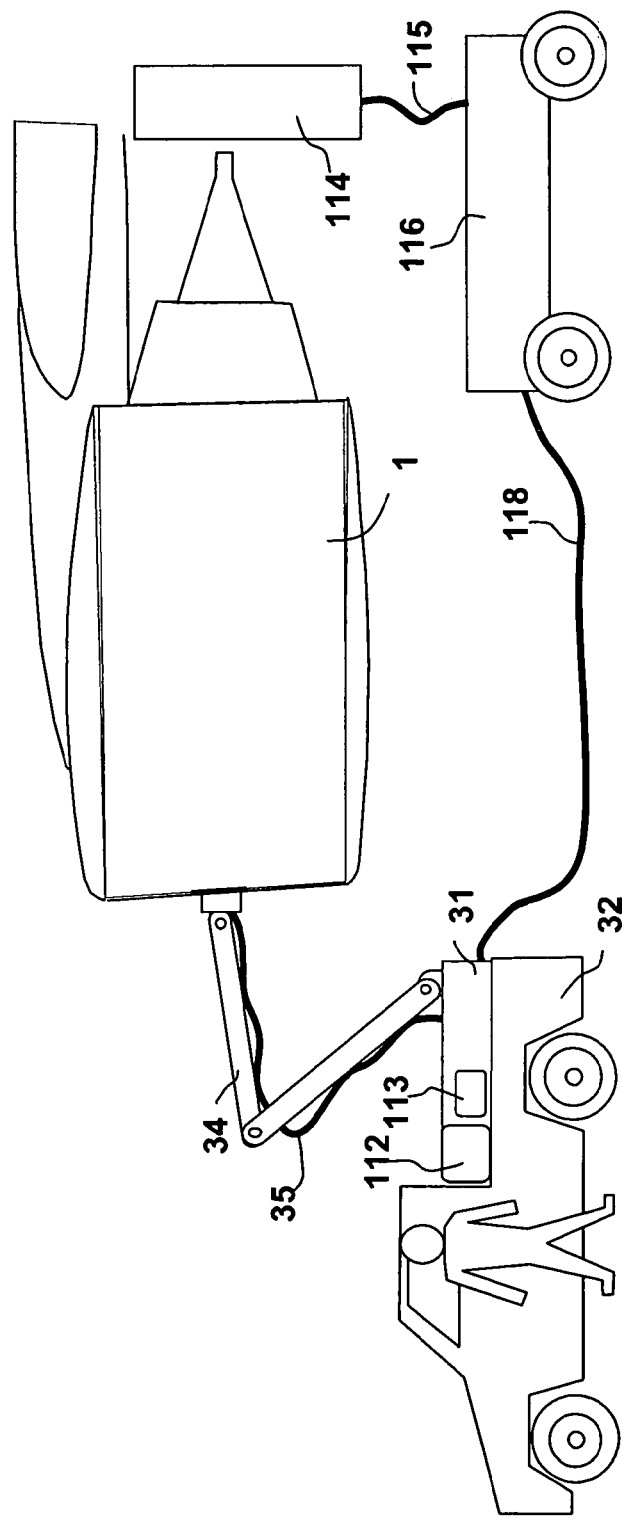
FIG. 10 shows the universal, no-contact spray head and a waste water collecting device with waste water treatment for reuse of the wash liquid.

The invention as here disclosed provides means for reducing the time for washing as well as reducing labour requirement. FIG. 10 shows the arrangement for engine washing that is both less time consuming and less labour intensive compared to prior art. Similar parts are shown with the same reference numbers as previous figures. The process described heir in would typically require only one operator for conducting the wash. A wash unit 31 supplies wash liquid via conduit 35 to a spray head held by robotic arm 34. During washing the operator controls the process from control panel 113. Controlling includes viewing the spray head camera image from monitor 112. The waste wash liquid emanating from the engine is collected by collecting device 114 at the rear of the engine. The collected waste liquid enters a tank (not shown) in unit 116 via conduit 115. Unit 116 may be equipped with wheels for mobility. A suitable collecting device is described in the international application PCT/SE 2004/000922, wherein the content of said application hereby is included herein by reference. The waste liquid is pumped via conduit 118 to a tank in wash unit 31 where the released fouling material is separated from the liquid by an appropriate waste water treatment process. The treated water will then be used for washing of next engine or is alternatively dumped into a sewer. While the waste water is being treated the operator may move his vehicle 32 and other equipment to the next engine for set-up for the next wash.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the present invention. This application is intended to cover any adaptations or variations of the preferred embodiments discussed herein. Consequently, the present invention is defined by the wordings of the appended claims and equivalents thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A washing system for washing a gas turbine engine, said washing system comprising:
   a spray device including at least one nozzle attached to a nozzle carrying body adapted to streamline inject wash fluid directly into an inlet of said engine during a washing operation;
   a wash unit adapted to distribute said wash fluid to said spray device;
   a positioning device configured to hold said spray device in a washing operation position adjacent to said engine inlet comprising an arm enabling the movement of said spray device, wherein said arm is configured to be movable via hand force; and
   a fluid collecting unit separate from said spray device, comprising a collecting device adapted to collect waste wash fluid entrained in an airstream emanating from said engine substantially horizontally during a washing operation of said engine.

2. The washing system according to claim 1, wherein said arm comprises a robotic arm including joints enabling a movement of said spray device in three dimensions.

3. The washing system according to claim 1, wherein said spray device further comprises an optical sensing device adapted to monitor a washing operation of an engine.

4. The washing system according to claim 3, wherein said optical sensing device comprises a camera or a fiber optic device.

5. The washing system according to claim 1, wherein said spray device further comprises:
   a distance measuring device adapted to measure a distance between said spray device and said engine.

6. The washing system according to claim 5, wherein said distance measuring device is connected to said control panel and is adapted to deliver an indication of said distance between said spray device and said engine, thereby informing an operator of a present distance between said spray device and said engine by means of a monitor.

7. The washing system according to claim 5, wherein said distance measuring device is selected from the group consisting of (a) an ultra sound sensing device comprising a transmitter adapted to emit a sound beam and a receiver adapted to receive said beam and (b) an optical measuring device comprising a transmitter adapted to emit a laser beam and receiver adapted to receive said beam, wherein said distance is estimated by a time difference for said beam to be transmitted from said transmitter to said receiver.

8. The washing system according to claim 5, wherein said distance measuring device further comprises an alarm means adapted to emit an alarm signal if said measured distance decreases below a predetermined value.

9. The washing system according to claim 1, wherein said spray device further comprises an illumination means.

10. A wash system comprising:
    a mobile unit;
    a wash unit associated with the mobile unit for providing wash fluid, wherein the wash unit is physically spaced from a surface of an engine inlet cowling during a washing process;
    one or more nozzles for streamline injecting wash fluid provided by the wash unit directly into an engine inlet; and
    an arm for use in positioning the one or more nozzles, wherein the arm is configured to be movable via hand force.

11. The wash system of claim 10, further comprising:
    a liquid collector unit for collecting used washing liquid that is entrained in an airstream and emanating from a gas turbine engine as a result of a washing procedure.

12. The wash system of claim 10, wherein the wash unit comprises one or more tanks.

13. The wash system of claim 12, wherein the wash unit further comprises one or more heaters for heating contents of one or more of the tanks.

14. The wash system of claim 12, wherein the wash unit further comprises one or more pumps for raising a pressure in one or more of the tanks, thereby enabling the wash unit to provide pressurized washing fluid.

15. The wash system of claim 10, further comprising one or more controls for use in regulating the wash unit, the one or more controls comprising at least one of a pressure meter, a flow meter, a temperature meter, and a pump on-off switch.

16. The wash system of claim 15, wherein one of the controls further comprises an optical sensing device adapted for monitoring a washing operation.

17. The wash system of claim 15, wherein one of the controls further comprises a distance measuring device for measuring a distance between the one or more nozzles and an engine being washed.

18. The wash system of claim 10, wherein the one or more nozzles comprises a manifold.

19. The wash system of claim 10, wherein said arm for use in positioning is a robotic arm including joints enabling a movement of said one or more nozzles in three dimensions.

* * * * *